United States Patent Office 3,282,943
Patented Nov. 1, 1966

3,282,943
N-SUBSTITUTION PRODUCTS OF POLYMETHYL-
ENE-TETRAHYDROQUINOLINES
Klaus Landgraf and Ernst Seeger, Biberach an der Riss,
Germany, assignors, by mesne assignments, to Boehringer Ingelheim G.m.b.H., Ingelheim (Rhine), Germany, a corporation of Germany
No Drawing. Filed Nov. 1, 1962, Ser. No. 234,862
Claims priority, application Germany, Nov. 14, 1961,
T 21,109
9 Claims. (Cl. 260—279)

This invention relates to N-substitution products of polymethylene-tetrahydroquinolines as well as to various methods of preparing such compounds.

More particularly, the present invention concerns N-aminoalkanoyl substitution products of polymethylene-tetrahydroquinolines of the formula

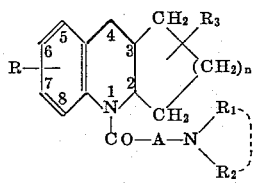

(I)

wherein A is straight or branched alkylene of 1 to 5 carbon atoms,

R is hydrogen, halogen, lower alkyl or lower alkoxy,
$R_1$ is hydrogen, lower alkyl or hydroxy-lower alkyl,
$R_2$ is lower alkyl or hydroxy-lower alkyl,
$R_1$ and $R_2$, together with each other and the adjacent nitrogen atom, are basic heterocycles, such as pyrrolidino, piperidino, morpholino and piperazino, or lower alkyl-substituted analogs of such heterocycles,
$R_3$ is hydrogen or lower alkyl of 1 to 3 carbon atoms, and
$n$ is an integer from 1 to 3, inclusive, their non-toxic, pharmacologically acceptable acid addition salts, and their quaternary ammonium salts formed with non-toxic quaternizing agents.

The basic N-substitution products of polymethylene-tetrahydroquinolines according to the present invention, that is, the compound embraced by Formula I above, may be prepared by transforming a polymethylene-tetrahydroquinoline of the formula

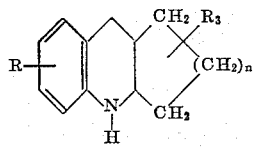

(II)

wherein R and $R_3$ have the same meanings as in Formula I, into the corresponding N-haloalkanoyl-substituted polymethylene-tetrahydroquinoline of the formula

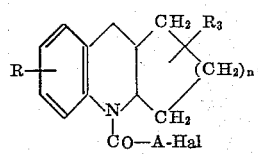

(III)

wherein R, $R_3$, A and $n$ have the same meanings as in Formula I and Hal is halogen, and thereafter exchanging the halogen Hal in compound III for the group

wherein $R_1$ and $R_2$ have the same meanings as in Formula I. Both the transformation of compound II into compound III and the exchange of the halogen atom for the amino group are accomplished by methods which are well known in principle to those having ordinary skill in the chemical art.

The polymethylene-tetrahydroquinolines of the Formula II, which are required as starting materials for the process of producing the N-aminoalkanoyl-substitution products according to the present invention, include members which have been described in the prior art as well as members which have not been specifically described in the prior art. However, those members which have not been specifically described in the literature or prior patents may be readily prepared by the methods described in the following literature references: Perkin and Sedgwick, J.C.S. London, 1924, 2448, and 1926, 438; Perkin and Plant, J.C.S. London, 1928, 639 and 2583; Plant and Rosen, J.C.S. London, 1930, 1840; and Adkins and Coonradt, J.A.C.S., 63, 1563 (1941). For instance, they may be obtained by reduction of the corresponding polymethylene-quinolines or polymethylene-quinolones, which are well known compounds. The polymethylene-tetrahydroquinoline starting compounds may be employed in the form of mixtures of the cis- and trans-stereoisomers or also in the form of the individual stereoisomers. The classification of the isomers according to their cis- or trans-form is described by Masamune in J.A.C.S. 79, 4418 (1957).

More particularly, the transformation of the polymethylene-tetrahydroquinolines II to the corresponding N-haloalkanoyl substitution products III is advantageously effected by reacting a polymethylene-tetrahydroquinoline of the Formula II with a haloalkanoyl-halide of the formula <p style="text-align:center">Hal'—CO—A—Hal      (IV)</p> wherein A has the same meanings as in Formula I, and Hal and Hal' are halogens, not necessarily identical. It is preferred to perform this reaction in the presence of an inert organic solvent, such as benzene, toluene, xylene and other aromatic hydrocarbons, ethers such as diethylether, dipropylether, etc., halogenated hydrocarbons such as methylene chloride, chloroform and the like, or ketones such as acetone, methyl ethyl ketone and the like. It is further advantageous to add to the reaction mixture a basic compound which ties up or neutralizes the hydrogen halide split off by the acylating reaction, such as pyridine, quinoline, diethylaniline, triethylamine and the like. However, the basic additive may also be an inorganic compound, such as an alkali metal carbonate or bicarbonate or an alkaline earth metal carbonate or bicarbonate. The reaction is generally performed by initially cooling the reaction mixture and then allowing it to proceed at room temperature or moderately elevated temperatures up to about 100° C.

The polymethylene-tetrahydroquinolines II may also be transformed into the corresponding N-haloalkanoyl-substitution products III by any other customary acylating reaction, for instance by reacting the former with symmetrical or mixed anhydrides of the desired haloalkane-carboxylic acid. Examples of suitable mixed anhydrides are those of the haloalkane-carboxylic acids formed with low-molecular-weight fatty acids or with carbonic acid monoesters.

The N-haloalkanoyl-polymethylene-tetrahydroquinolines of the Formula III which are obtained as intermediate products by the above reaction are in most instances readily crystallizable, colorless substances; however, a few of them are oils. They do not need to be purified prior to their employement as starting materials in the second step of the process.

The conversion of intermediate compounds III into the desired end products of the Formula I is effected by reacting the former with a primary or secondary amine of the formula

wherein $R_1$ and $R_2$ have the same meanings as in Formula I. The reaction is advantageously carried out in the presence of an inert organic solvent, such as benzene, toluene, xylene, methylene chloride, acetone and the like, and at moderately elevated temperatures up to about 150° C. If necessary, for instance if the amine reactant is volatile, the reaction may be carried out in a pressure vessel at superatmospheric pressure. The amine is preferably used in an amount corresponding to from 1 to 10 mols over and above the stoichiometric quantity in order to tie up the hydrogen halide liberated by the reaction. However, in place of the excess of amine other acid-binding agents, such as pyridine, diethylaniline, alkali metal carbonates, alkali metal bicarbonates and the like, may be added to the reaction mixture.

After completion of the reaction, the reaction product may be isolated by customary methods. For instance, the reaction mixture is first shaken with water to extract water-soluble components. Thereafter, the desired reaction product is extracted from the organic solvent by shaking the solution with an aqueous mineral acid such as hydrochloric acid or sulfuric acid. The acid extract solution is then made alkaline with an alkali metal hydroxide, alkali metal bicarbonate or ammonia to precipitate the compounds I in the form of the free base.

The free bases thus obtained may be converted into their non-toxic acid addition salts or non-toxic quaternary ammonium salts by customary methods. For instance, the non-toxic acid addition salts may be obtained by dissolving the free bases in a suitable inert organic solvent and acidifying the solution with the desired non-toxic acid. Examples of such non-toxic acids are hydrochloric acid, hydrobromic acid, sulfuric acid, phosphoric acid, nitric acid, acetic acid, propionic acid, butyric aid, valeric acid, oxalic acid, malonic acid, succinic acid, maleic acid, fumaric acid, lactic acid, tartaric acid, citric acid, malic acid, benzoic acid, phthalic aid, cinnamic acid, salicyclic acid, nicotinic acid, 2-furoic acid, 8-chlorotheophylline and the like.

Similarly, the non-toxic quaternary ammonium salts may be obtained, for instance, by reacting the free bases at moderately elevated temperatures with a non-toxic quaternizing agent. Typical examples of such quaternizing agents are alkyl chlorides, bromides, and iodides, such as methyl iodide, methyl bromide, ethyl iodide and isobutyl bromide; aralkyl chlorides, bromides and iodides, such as benzyl bromide; organic esters of aromatic sulfonic acids, such as p-toluene-sulfonic acid alkyl esters; dimethyl sulfate and diethyl sulfate; cyclohexyl-chloride, -bromide and -iodide; cyclopentyl-chloride, -bromide and -iodide; and the like.

The following examples will further illustrate the present invention and enable others skilled in the art to understand the invention more completely. Since the method described above produces the cis- or trans-stereoisomers of the desired end products or also mixtures of these stereoisomers, depending upon the synthesis of the starting compounds II, the end products in those examples below where the nomenclature does not include an indication of the stereoisomeric form of the product are compounds whose stereoisomeric configuration cannot be determined with any degree of certainty; hence, in those examples the end product may be a mixture of stereoisomers or may consist of individual stereoisomers of undetermined stereoisomeric configuration. It should be understood, however, that the invention is not limited to the particular compounds illustrated in these examples.

EXAMPLE 1

*Preparation of 1-(piperidino-acetyl)-trans-2,3-tetramethylene-1,2,3,4-tetrahydroquinoline (10-piperidino-acetyl-trans-1,2,3,4,9,9a,10,10a-octahydro-acridine)*

(a) 10 gm. of trans-2,3-tetramethylene-1,2,3,4-tetrahydroquinoline (also known as trans-1,2,3,4,9,9a,10,10a-octahydro-acridine), having a melting point of 82° C., were dissolved in 100 cc. of anhydrous benzene, and 6.7 gm. of pyridine were added to the resulting solution. Thereafter, while thoroughly stirring and cooling the reaction mixture 8.3 gm. of chloroacetic acid chloride were added dropwise taking care that the temperature of the reaction mixture did not rise above 10° C. After all of the chloroacetic acid chloride had been added, the cooling device was removed and the reaction mixture was stirred for six hours at room temperature. At the end of this time 100 cc. of cold water were added while continuing the agitation. Thereafter, stirring was discontinued and the mixture was allowed to separate into a benzene phase and an aqueous phase. The benzene phase was separated and was shaken twice with an aqeuous 5% hydrochloric acid solution and then once with water. The benzene solution was dried over sodium sulfate, and then the benzene was evaporated in vacuo. The oil remaining behind was caused to crystallize by adding petroleum ether, yielding a colorless substance which was identified to be 1-chloroacetyl-trans-2,3-tetramethylene-1,2,3,4 - tetrahydroquinoline (10 - chloroacetyl - trans-1,2,3,4,9,9a,10,10a-octahydro-acridine) of the formula

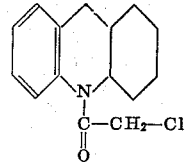

having a melting point of 74–75° C. The yield was 92% of theory.

(b) 6 gm. of 1-chloroacetyl-trans-2,3-tetramethylene-1,2,3,4-tetrahydroquinoline were dissolved in 50 cc. of benzene, and 4.1 gm. of piperidine were added to the solution. The resulting mixture was refluxed for two hours on an oil bath at 110° C. and was then allowed to cool. Thereafter, the reaction mixture was shaken three times with water to extract piperidine hydrochloride and unreacted piperidine. The basic reaction product was then extracted with dilute aqueous hydrochloric acid; the acid aqueous extract solution was made alkaline with ammonia, whereby an oil separated out which was taken up in ether. The ethereal solution was dried over sodium sulfate, and then the ether was distilled off. The distillation residue was identified to be 1-piperidinoacetyl-trans-2,3-tetramethylene-1,2,3,4-tetrahydroquinoline (alternative nomenclature: 10 - piperidinoacetyl-trans-1,2,3,4,9,9a,10,10a-octahydroacridine) of the formula

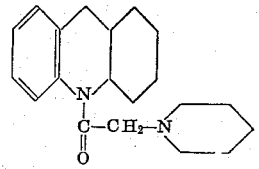

This free base was converted with ethereal hydrochloric acid into its hydrochloric acid addition salt, which was purified by recrystallization from a mixture of ethanol and ether. It had a melting point of 231° C. The yield was 6 gm.

EXAMPLE 2

Using a procedure analogous to that described in Example 1, 1-piperidinoacetyl-cis-2,3-tetramethylene-1,2,3,4-tetrahydroquinoline hydrochloride, having a melting point of 205° C., was prepared from cis-2,3-tetramethylene- 1,2,3,4-tetrahydroquinoline (M.P. 72° C.) through the colorless crystalline intermediate 1-chloroacetyl-cis-2,3-tetramethylene-1,2,3,4-tetrahydroquinoline (M.P. 65° C.; yield: 75% of theory) and reaction of the latter with piperidine.

EXAMPLE 3

*Preparation of 1-(β-dimethylamino-propionyl)-trans-2,3-tetramethylene-1,2,3,4-tetrahydroquinoline [10-(β-dimethylamino-propionyl)-trans-1,2,3,4,9,9a,10,10a-octahydroacridine]*

(a) 20 gm. of trans - 2,3 - tetramethylene - 1,2,3,4-tetrahydroquinoline (alternate nomenclature: trans-1,2,3,4,9,9a,10,10a-octahydro-acridine), M.P. 82° C., and 18.6 gm. of β-chloro-propionic acid chloride were reacted with each other under the conditions described in Example 1(a), yielding 88% of the theoretical amount of 1-(β-chloropropionyl)-trans-2,3-tetramethylene-1,2,3,4-tetrahydroquinoline of the formula

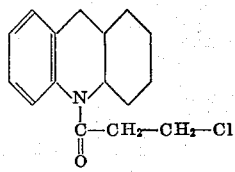

in the form of a colorless substance having a melting point of 119–120° C. (recrystallized from cyclohexane).

(b) 5 gm. of 1-(β-chloropropionyl)-trans-2,3-tetramethylene-1,2,3,4,-tetrahydroquinoline and 3.25 gm. of dimethylamine were dissolved in 75 cc. of toluene, and the resulting solution was heated at about 110° C. for 1½ hours in a closed vessel. The reaction mixture was worked up as described in Example 1(b), yielding 1-(β-dimethylamino-propionyl)-trans-2,3-tetramethylene - 1,2,3,4-tetrahydroquinoline of the formula

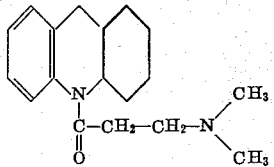

in the form of an oil having a boiling point of 147° C. at 0.1 mm. Hg.

This free base was transformed into its hydrochloride with ethereal hydrochloric acid. The hydrochloride was a colorless substance having a melting point of 182° C. (recrystallized from acetone). The yield was 4 gm.

The acid maleinate of the base had a melting point of 131° C. (N calculated: 6.79%; N found: 6.98%).

The acid oxalate had a melting point of 150° C. (decomposition).

EXAMPLE 4

Using a procedure analogous to that described in Example 3, but starting from 4-propyl-1,2,3,4,9,9a,10,10a-octahydroacridine (M.P. 85° C.), the end product was 4-propyl - 10 - (β - dimethylamino - propionyl) - 1,2,3,4,9, 9a,10,10a-octahydroacridine of the formula

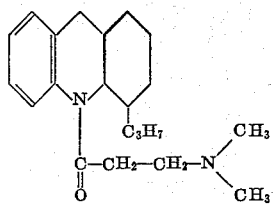

whose hydrochloride had a melting point of 173° C.

EXAMPLE 5

*Preparation of 1-(β-dimethylamino-propionyl)-cis-2,3-tetramethylene - 1,2,3,4 - tetrahydroquinoline [10 - (β - dimethylamino - propionyl) - cis - 1,2,3,4,9,9a,10a - octahydroacridine]*

(a) 11 gm. of cis-2,3-tetramethylene-1,2,3,4-tetrahydroquinoline (alternative nomenclature: cis-1,2,3,4,9,9a,10, 10a-octahydroacridine), having a melting point of 72° C., and 7.5 gm. of dry sodium bicarbonate were dissolved in 200 cc. of acetone, and then 9 gm. of β-chloro-propionic acid chloride were added dropwise to the solution at a temperature of about 20–25° C., accompanied by stirring. After all of the β-chloro-propionic acid chloride had been added, the reaction mixture was refluxed for three hours. Thereafter, the reaction mixture was allowed to cool and was then vacuum filtered. The filtrate was evaporated to dryness and the residue was taken up in ether. The ether solution was shaken first with an aqueous 2% sodium hydroxide solution and then with water. Thereafter, the ether was evaporated and the residue was recrystallized from petroleum ether, yielding 1-(β-chloropropionyl)-cis-2,3 - tetramethylene - 1,2,3,4 - tetrahydroquinoline [10-(β-chloropropionyl) - cis - 1,2,3,4,9,9a,10,10a - octohydroacridine] having a melting point of 80–82° C. The yield was 84% of theory.

(b) The intermediate compound thus obtained was then reacted with dimethylamine, as described in Example 3(b), yielding 1 - (β-dimethylamino-propionyl)-cis-2,3-tetramethylene-1,2,3,4 - tetrahydroquinoline [10 - (β - dimethylamino - propionyl) - cis - 1,2,3,4,9,9a,10,10a - octahydroacridine]. The yield was 70% of theory.

EXAMPLE 6

*Preparation of 1 - (β - piperidino - propionyl) - 2,3 - trimethylene - 1,2,3,4 - tetrahydroquinoline [4 - (β - piperidino - propinoyl) - 2,3,3a,4,9,9a - hexahydro - 1 H-cyclo-penta-[b]-quinoline]*

(a) 8.6 gm. of 2,3 - trimethylene - 1,2,3,4 - tetrahydroquinoline (B.P. 99–101° C. at 0.7 mm. Hg) were dissolved in 100 cc. of benzene, 6 gm. of pyridine were added to the solution, and then 8.3 gm. of β-chloropropionyl chloride were added to the mixture dropwise while stirring and cooling the mixture. After all of the β-chloropropionyl chloride had been added, the reaction mixture was stirred for two hours at room temperature, was then warmed gradually to 50–70° C. and was subsequently stirred for about two hours more. Thereafter, the reaction mixture was allowed to cool and was shaken first with an aqueous 5% hydrochloric acid solution and then with water. The aqueous extract solutions were discarded. The benzene phase was dried over sodium sulfate and then the benzene was distilled off. The initially oily residue crystallized after a short period of time. The raw crystalline product was recrystallized from petroleum ether, yielding 8.0 gm. of 1-(β-chloropropionyl)-2,3-trimethylene-1,2,3,4-tetrahydroquinoline of the formula

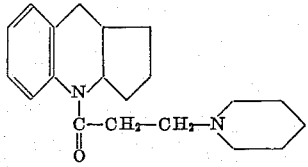

having a melting point of 104–106° C.

(b) The intermediate compound thus obtained was dissolved in 50 cc. of benzene, 5.1 gm. of piperidine were added to the solution and the mixture was refluxed for one hour on a water bath. The reaction mixture was then extracted by shaking with water, the aqueous extract solution was discarded, and the benzene phase was extracted with an aqueous 5% solution of hydrochloric acid. The acid aqueous extract solution was admixed with potassium carbonate, whereby a precipitate formed, which was taken up in ether. The ether solution was dried over sodium sulfate and the solvent was evaporated. The basic residue, weighing 6 gm., was identified to be 1-(β-piperidino - propionyl) - 2,3 - trimethylene - 1,2,3,4 - tetrahydroquinoline of the formula

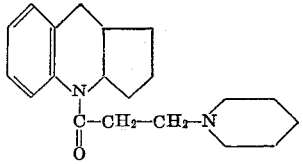

Ethereal hydrochloric acid was added to the basic residue, yielding the hydrochloric acid addition salts of the base. The hydrochloride thus obtained was recrystallized from acetone, whereupon it had a melting point of 186–187° C.

The same result was obtained when the above described procedure was repeated with acetone as the inert solvent instead of benzene, and with sodium carbonate as the acid-binding agent instead of pyridine.

EXAMPLE 7

*Preparation of 1 - dimethylaminoacetyl - 2,3 - pentamethylene - 1,2,3,4 - tetrahydroquinoline (5 - dimethylamino - acetyl - 5,5a,7,8,9,10,10a,11 - octahydro - 6 H-cyclo-hepta-[b]-quinoline)*

(a) 20 gm. of 2,3-pentamethylene-1,2,3,4-tetrahydroquinoline (alternative nomenclature: 5,5a,7,8,9,10,10a,11-octahydro-6H-cyclo-hepta-[b]-quinoline), having a boiling point of 114–116° C. at 0.1 mm. Hg, were dissolved in 200 cc. of benzene, and 12 gm. of pyridine were added to the solution. 14.7 gm. of chloroacetyl-chloride were added dropwise to the mixture at a temperature of 0 to 10° C., accompanied by stirring. After all of the chloroacetylchloride had been added, the reaction mixture was stirred for two hours at 20° C.; then the temperature was slowly raised to 70° C. and this temperature was maintained for an additional hour. The reaction mixture was allowed to stand overnight at room temperature. Thereafter, the cool reaction mixture was shaken first with an aqueous 5% hydrochloric acid solution and then with water. The aqueous extract solutions were discarded. The benzene solution was dried and the benzene was distilled off. The residue was an oil having a boiling point of 166–167° C., which was identified to be 1-chloroacetyl-2,3-pentamethylene-1,2,3,4-tetrahydroquinoline of the formula

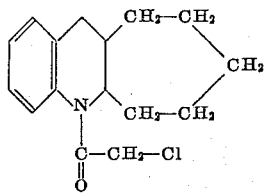

The yield was 79% of theory. This compound was used in the subsequent reaction without further purification.

(b) 11 gm. of 1-chloroacetyl-2,3-pentamethylene-1,2, 3,4-tetrahydroquinoline were dissolved in 50 cc. of toluene, and the solution was admixed with a 30% solution of dimethylamine in benzene. The combined solution was heated for one hour at 100–110° C. in a pressure vessel. Thereafter, the reaction mixture was washed with water, extracted with dilute hydrochloric acid, made alkaline with ammonia and extracted with ether. The ether was distilled out of the ether extract solution, whereby an oily residue was obtained which was identified to be 1-(dimethylaminoacetyl) - 2,3 - pentamethylene - 1,2,3,4-tetrahydroquinoline of the formula

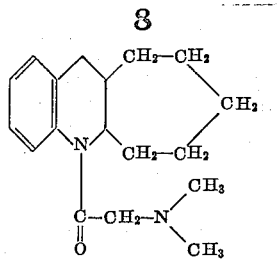

The oily residue was taken up in ether, the resulting solution was admixed with a solution of anhydrous oxalic acid in anhydrous acetone, and the combined solution was heated for a short period of time. After a brief period of standing a crystalline precipitate separated out, which was isolated and boiled with acetone. The colorless acid oxalate of the base was thus obtained. It had a melting point of 167–169° C. (decomposition). The yield was 7 gm.

*Analysis.*—Calculated: C, 63.80%; H, 7.40%; N, 7.44%. Found: C, 63.50%; H, 7.20%; N, 7.56%.

EXAMPLE 8

*Preparation of 6-chloro-1-(β-dimethylamino-propionyl)-cis-2,3-tetramethylene-1,2,3,4-tetrahydroquinoline iodoethylate [7-chloro-10-(β-dimethylamino-propionyl)cis-1,2,3,4,9,9a,10,10a-octahydroacridine iodoethylate]*

Using a procedure analogous to that described in Example 4, but using 6-chloro-cis-2,3-tetramethylene-1,2,3,4-tetrahydroquinoline (M.P. 47° C.) as the starting material in step (a) instead of cis-2,3-tetramethylene-1,2,3,4-tetrahydroquinoline, the reaction product obtained in step (b) was 6-chloro-1-(β-dimethylamino-propionyl)-cis-2,3-tetramethylene-1,2,3,4-tetrahydroquinoline of the formula

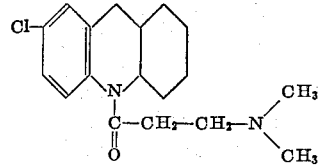

2 gm. of this base and 10 gm. of ethyl iodide were dissolved in 50 cc. of anhydrous benzene, and the solution was refluxed for three hours. The precipitate formed during that time was separated by vacuum filtration and was recrystallized from a mixture of ethanol and acetone, yielding 2.5 gm. of a colorless crystalline substance which was identified to be 6-chloro-1-(β-dimethylamino-propionyl)-cis-2, 3-tetramethylene-1,2,3,4-tetrahydroquinoline iodoethylate of the formula

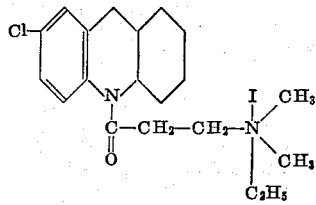

having a melting point of 209° C.

In analogous fashion, the following other quaternary ammonium salts were prepared:

(a) 6 - chloro - 1 - (pyrrolidino-acetyl) - cis-2,3-tetramethylene-1,2,3,4-tetrahydoquinoline bromoethylate [7-chloro - 10 - (pyrrolidino-acetyl) - cis-1,2,3,4,9,9a,10,10a-octahydroacridine bromoethylate], M.P. 180° C., of the formula

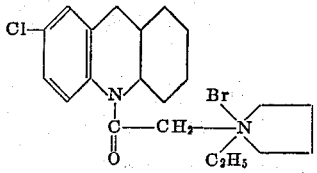

from 6-chloro-1-(pyrrolidino-acetyl)-cis-2,3-tetramethylene-1,2,3,4-tetrahydroquinoline and ethylbromide.

(b) 1-(β-piperidino-propionyl)-cis-2,3 - tetramethylene-1,2,3,4-tetrahydroquinoline bromobenzylate [10-(β-piperidino-propionyl)-cis-1,2,3,4,9,9a,10,10a - octahydroacridine bromobenzylate], M.P. 191–192° C., of the formula

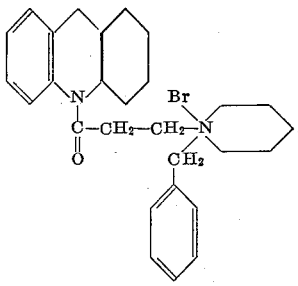

from 1-(β-piperidino-propionyl)-cis-2,3 - tetramethylene-1,2,3,4-tetrahydroquinoline (see Example 27) and benzyl bromide.

EXAMPLE 9

*Preparation of 1-(dimethylamino-acetyl)-trans-2,3-tetramethylene-1,2,3,4-tetrahydroquinoline [10 - (dimethylaminoacetyl)-trans-1,2,3,4,9,9a,10,10a-octahydroacridine]*

(a) 4.8 gm. of chloroacetic acid were dissolved in 100 cc. of absolute benzene, and 5.1 gm. of triethylamine were added dropwise to the solution. 6 gm. of chloroformic acid ethyl ester were added, and the resulting mixture was stirred for two hours. A solution of the mixed anhydride of acetic acid and formic acid was obtained. A solution of 9.4 gm. of trans-2,3-tetramethylene-1,2,3,4-tetrahydroquinoline in benzene was added dropwise to the mixed anhydride solution, and the resulting reaction mixture was stirred for 20 hours at room temperature. Thereafter, it was heated for two hours on a water bath at 80° C. The reaction mixture was filtered, the filtrate was purified by shaking it first with dilute hydrochloric acid and then with an aqueous sodium bicarbonate solution, and then the benzene was distilled off. The residue was an oil which crystallized upon treatment with cyclohexane. The crystalline product had a melting point of 75° C. and was identified to be 1-chloroacetyl-trans-2,3-tetramethylene-1,2,3,4-tetrahydroquinoline of the formula shown in Example 1.

(b) 7.3 gm. of this compound were dissolved in 50 cc. of benzene, 5 gm. of a 50% solution of dimethylamine in benzene were added, and the resulting reaction solution was heated for two hours at 100° C. Thereafter, the reaction mixture was allowed to cool and was shaken several times with water, the aqueous extract solutions being discarded. The reaction mixture was then extracted with dilute aqueous hydrochloric acid. The acid aqueous extract solution was made alkaline with sodium hydroxide, whereupon an oil separated out, which was taken up in ether. The ether solution was dried over potassium carbonate, the ether was evaporated, and the oily residue was distilled in vacuo. 6.1 gm. of 1-(dimethylaminoacetyl)-trans-2,3-tetramethylene-1,2,3,4 - tetrahydroquinoline of the formula

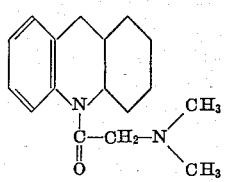

having a boiling point of 135–138° C. at 0.07 mm. Hg were obtained. The initially oily product gradually solidified upon standing. It was recrystallized from petroleum ether, whereupon it had a melting point of 89° C.

The hydrochloric acid addition salt of the base had a melting point of 211° C.

EXAMPLE 10

*Preparation of 1-(dimethylamino-acetyl)-cis-2,3 - tetramethylene-1,2,3,4 - tetrahydroquinoline [10 - dimethylaminoacetyl-cis-1,2,3,4,9,9a,10,10a-octahydroacridine]*

(a) 10 gm. of cis-2,3-tetramethylene-1,2,3,4-tetrahydroquinoline were admixed with 20 gm. of monochloroacetic acid anhydride and 5 gm. of anhydrous sodium acetate, and the resulting mixture was heated for two hours on a boiling water bath. The reaction mixture was poured into water, whereby an oil separated out, which was taken up in ether. The ether solution was dried and the ether was distilled off. The oil remaining behind was made to crystallize by adding petroleum ether. 10 gm. of 1-chloroacetyl-cis-2,3-tetramethylene - 1,2,3,4 - tetrahydroquinoline, having a melting point of 65° C., were obtained.

(b) 5 gm. of 1-chloroacetyl-cis-2,3-tetramethylene-1,2,3,4-tetrahydroquinoline were dissolved in 50 cc. of benzene, a solution of 2.5 gm. of dimethylamine in 25 cc. of benzene was added, and the resulting mixture was heated for two hours at 120° C. in an autoclave. Thereafter, the reaction mixture was worked up as described in Example 9(b), yielding 1-(dimethylamino-acetyl)-cis-2,3-tetramethylene-1,2,3,4-tetrahydroquinoline.

This free base was transformed into its hydrochloride, which had a melting point of 202° C. after recrystallization from a mixture of ethanol and ether. The yield of hydrochloride was 4 gm.

EXAMPLE 11

Using a procedure analogous to that described in Example 6, 1-(diethylamino-acetyl)-2,3-trimethylene-1,2,3,4-tetrahydroquinoline of the formula

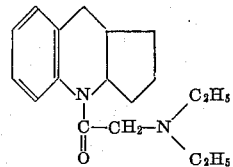

was prepared from 2,3 - trimethylene - 1,2,3,4 - tetrahydroquinoline, chloroacetyl-chloride and dimethylamine through the intermediate 1-chloroacetyl-2,3-trimethylene-1,2,3,4-tetrahydroquinoline (M.P. 86° C.).

The oxalate of the base had a melting point of 128–130° C. (decomposition).

EXAMPLE 12

Using a procedure analogous to that described in Example 6, 1-(β-dimethylamino-propionyl)-2,3 - trimethylene-1,2,3,4-tetrahydroquinoline of the formula

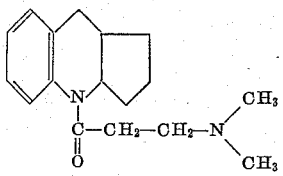

was prepared from 2,3-trimethylene-1,2,3,4-tetrahydroquinoline, β-chloropropionyl-chloride and dimethylamine through the intermediate 1-(β-chloropropionyl)-2,3-trimethylene-1,2,3,4-tetrahydroquinoline.

The oxalate of the base had a melting point of 135° C.

EXAMPLE 13

Using a procedure analogous to that described in Example 1, 1-(diethylamino-acetyl)-trans-2,3-tetramethyl-1,2,3,4-tetrahydroquinoline of the formula

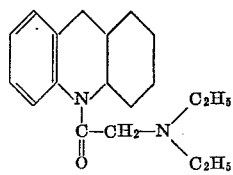

was prepared from trans-2,3-tetramethylene-1,2,3,4-tetrahydroquinoline, chloroacetyl-chloride and diethylamine through the intermediate 1-chloroacetyl-trans-2,3-tetramethylene-1,2,3,4-tetrahydroquinoline.

The hydrochloride of the trans-base had a melting point of 176° C.

The hydrochloride of the cis-base, obtained in the same manner starting from cis-2,3-tetramethylene-1,2,3,4-tetrahydroquinoline, had a melting point of 161° C.

EXAMPLE 14

Using a procedure analogous to that described in Example 1, 1-(di-n-propylamino-acetyl)-cis-2,3-tetramethylene-1,2,3,4-tetrahydroquinoline of the formula

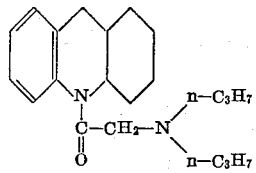

was prepared from cis-2,3-tetramethylene-1,2,3,4-tetrahydroquinoline, chloroacetyl-chloride and di-n-propylamine through the intermediate 1-(chloroacetyl)-cis-2,3-tetramethylene-1,2,3,4-tetrahydroquinoline.

The hydrochloride of the cis-base had a melting point of 200° C.

EXAMPLE 15

Using a procedure analogous to that described in Example 1, 1-(pyrrolidino-acetyl)-trans-2,3-tetramethylene-1,2,3,4-tetrahydroquinoline of the formula

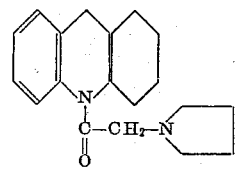

was prepared from trans-2,3-tetramethylene-1,2,3,4-tetrahydroquinoline, chloroacetyl-chloride and pyrrolidine through the intermediate 1-chloroacetyl-trans-2,3-tetramethylene-1,2,3,4-tetrahydroquinoline.

The hydrochloride of the trans-base had a melting point of 197° C.

The hydrochloride of the cis-base, obtained in the same manner starting from cis-2,3-tetramethylene-1,2,3,4-tetrahydroquinoline, had a melting point of 245° C.

EXAMPLE 16

Using a procedure identical to that described in Example 1, 1-(piperidino-acetyl)-cis-2,3-tetramethylene-1,2,3,4-tetrahydroquinoline of the formula shown in Example 1 (b) was prepared starting from cis-2,3-tetramethylene1,2,3,4-tetrahydroquinoline. The hydrochloride of the cis-base had a melting point of 205° C.

EXAMPLE 17

Using a procedure analogous to that described in Example 1, 1-(3'-methylpiperidino-acetyl)-trans-2,3-tetramethylene-1,2,3,4-tetrahydroquinoline of the formula

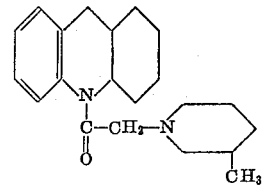

having a boiling point of 164–165° C. at 0.06 mm. Hg, was prepared from trans-2,3-tetramethylene-1,2,3,4-tetrahydroquinoline, chloroacetyl-chloride and 3-methylpiperidine.

EXAMPLE 18

Using a procedure analogous to that described in Example 1, 1-(3'-ethylpiperidino-acetyl)-trans-2,3-tetramethylene-1,2,3,4-tetrahydroquinoline of the formula

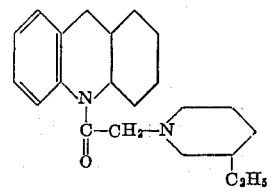

having a boiling point of 165–169° C. at 0.05 mm. Hg, was prepared from trans-2,3-tetramethylene-1,2,3,4-tetrahydroquinoline, chloroacetyl-chloride and 3-ethyl-pyridine.

EXAMPLE 19

Using a procedure analogous to that described in Example 1, 1-(morpholino-acetyl)-trans-2,3-tetramethylene-1,2,3,4-tetrahydroquinoline of the formula

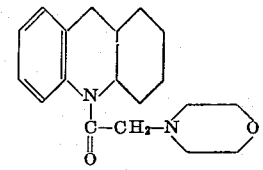

having a melting point of 103° C., was prepared from trans-2,3-tetramethylene-1,2,3,4-tetrahydroquinoline, chloroacetyl-chloride and morpholine.

The hydrochloride of the trans-base had a melting point of 220° C.

EXAMPLE 20

Using a procedure analogous to that described in Example 1, 1-(N'-methyl-piperazino)-trans-2,3-tetramethylene-1,2,3,4-tetrahydroquinoline of the formula

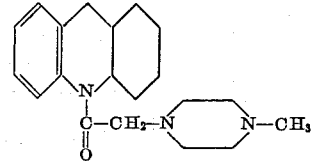

was prepared from trans-2,3-tetramethylene-1,2,3,4-tetrahydroquinoline, chloroacetyl-chloride and N-methyl-piperazine. The hydrochloride of the trans-base had a melting point of 240° C.

EXAMPLE 21

The end product of Example 5, i.e. 1-(β-dimethylamino-propionyl)-cis-2,3-tetramethylene-1,2,3,4-tetrahydroquinoline, was treated with ethereal hydrochloric acid to yield the hydrochloric acid addition salt of the cis base. The hydrochloride had a melting point of 170° C.

EXAMPLE 22

Using a procedure analogous to that described in Example 3, 1-(β-diethylamino - propionyl) - trans - 2,3-tetramethylene-1,2,3,4-tetrahydroquinoline of the formula

[structure: trans-2,3-tetramethylene-1,2,3,4-tetrahydroquinoline with N–C(=O)–CH$_2$–CH$_2$–N(C$_2$H$_5$)$_2$]

was prepared from trans - 2,3 - tetramethylene - 1,2,3,4-tetrahydroquinoline, β-chloropropionyl-chloride and diethyl amine through the intermediate 1 - (β - chloropropionyl) - trans - 2,3 - tetramethylene - 1,2,3,4 - tetrahydroquinoline.

The hydrochloride of the trans-base had a melting point of 140° C.

The hydrochloride of the corresponding cis-base, prepared by the method of Example 5 from cis-2,3-tetramethylene - 1,2,3,4 - tetrahydroquinoline, β - chloropropionyl-chloride and dimethylamine, had a melting point of 119° C.

EXAMPLE 23

Using a procedure analogous to that described in Example 3, 1 - (β - di - n - propylamino - propionyl) - trans - 2,3 - tetramethylene - 1,2,3,4 - tetrahydroquinoline of the formula

[structure with N–C(=O)–CH$_2$–CH$_2$–N(n-C$_3$H$_7$)$_2$]

was prepared from trans - 2,3 - tetramethylene - 1,2,3,4-tetrahydroquinoline, β - chloropropionyl - chloride and di-n-propylamine.

The oxalate of the trans-base had a melting point of 110° C.

EXAMPLE 24

Using a procedure analogous to that described in Example 3, 1 - (β - n - propylamino - propionyl) - trans - 2,3-tetramethylene-1,2,3,4-tetrahydroquinoline of the formula

[structure with N–C(=O)–CH$_2$–CH$_2$–NH(n-C$_3$H$_7$)]

was prepared from trans - 2,3 - tetramethylene - 1,2,3,4-tetrahydroquinoline, β-chloropropionyl-chloride and n-propylamine.

The hydrochloride of the trans-base had a melting point of 133° C.

EXAMPLE 25

Using a procedure analogous to that described in Example 3, 1 - [β - {bis - (β' - hydroxyethyl) - amino} - propionyl] - trans - 2,3 - tetramethylene - 1,2,3,4 - tetrahydroquinoline of the formula

[structure with N–C(=O)–CH$_2$–CH$_2$–N(CH$_2$–CH$_2$OH)$_2$]

was prepared from trans - 2,3 - tetramethylene - 1,2,3,4-tetrahydroquinoline, β - chloropropionyl - chloride and di-(β-hydroxyethyl)-amine.

The hydrochloride of the trans-base had a melting point of 117° C.

EXAMPLE 26

Using a procedure analogous to that described in Example 3, 1 - (β - pyrrolidino - propionyl) - trans - 2,3-tetramethylene-1,2,3,4-tetrahydroquinoline of the formula

[structure with N–C(=O)–CH$_2$–CH$_2$–N(pyrrolidine)]

was prepared from trans - 2,3 - tetramethylene - 1,2,3,4-tetrahydroquinoline, β - chloropropionyl - chloride and pyrrolidine.

The hydrochloride of the trans-base had a melting point of 178° C.

The hydrochloride of the corresponding cis-base, prepared by the method of Example 5 from cis-2,3-tetramethylene-1,2,3,4-tetrahydroquinoline, β-chloropropionyl-chloride and pyrrolidino, had a melting point of 160° C.

EXAMPLE 27

Using a procedure analogous to that described in Example 3, 1-(β-piperidino-propionyl)-trans-2,3-tetramethylene-1,2,3,4-tetrahydroquinoline of the formula

[structure with N–C(=O)–CH$_2$–CH$_2$–N(piperidine)]

was prepared from trans-2,3-tetramethylene-1,2,3,4-tetrahydroquinoline, β-chloropropionyl-chloride and piperidine.

The hydrochloride of the trans-base had a melting point of 191–193° C.

The hydrochloride of the corresponding cis-base, prepared by the method of Example 5 from cis-2,3,-tetramethylene-1,2,3,4-tetrahydroquinoline, β-chloropropionyl-chloride and piperidine, had a melting point of 150° C.

EXAMPLE 28

Using a procedure analogous to that described in Example 3, 1-(β-morpholino-propionyl)-trans-2,3-tetramethylene-1,2,3,4-tetrahydroquinoline of the formula

[structure with N–C(=O)–CH$_2$–CH$_2$–N(morpholine)]

was prepared from trans-2,3,-tetramethylene-1,2,3,4-tetrahydroquinoline, β-chloropropionyl-chloride and morpholine.

The hydrochloride of the trans-base had a melting point of 221° C.

The hydrochloride of the corresponding cis-base, prepared by the method of Example 5 from cis-2,3-tetramethylene-1,2,3,4-tetrahydroquinoline, β-chloropropionyl-chloride and morpholine, had a melting point of 187° C.

EXAMPLE 29

Using a procedure analogous to that described in Example 3, 1-(β-N'-methylpiperazino-propionyl)-trans-2,3-tetramethylene-1,2,3,4-tetrahydroquinoline of the formula

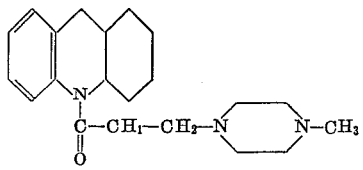

was prepared from trans-2,3-tetramethylene-1,2,3,4-tetrahydroquinoline, β-chloropropionyl-chloride and N-methylpiperazine.

The hydrochloride of the trans-base had a melting point of 250° C.

EXAMPLE 30

Using a procedure analogous to that descrbied in Example 3, 1 - (γ - dimethylamino-butyryl)-trans-2,3-tetramethylene-1,2,3,4,-tetrahydroquinoline of the formula

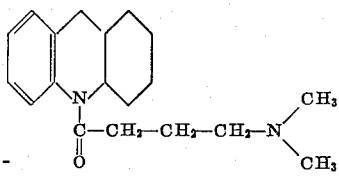

was prepared from trans-2,3-tetramethylene-1,2,3,4-tetrahydroquinoline, γ-bromotbutyryl-bromide and dimethylamine through the intermediate 1-(γ-bromobutyryl)-trans-2,3-tetramethylene-1,2,3,4-tetrahydroquinoline (M.P. 76° C.).

The hydrochloride of the trans-base had a melting point of 140° C.

EXAMPLE 31

Using a procedure analogous to that described in Example 3, 1-(γ-morpholino-butyryl)-trans-2,3-tetramethylene-1,2,3,4-tetrahydroquinoline of the formula

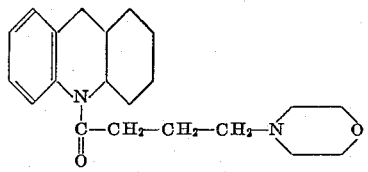

was prepared from trans-2,3-tetramethylene-1,2,3,4,-tetrahydroquinoline, γ-bromobutyryl-bromide and morpholine.

The hydrochloride of the trans-base had a melting point of 183° C.

EXAMPLE 32

Using a procedure analogous to that described in Example 3, 1-(ω-dimethylamino-pentanoyl)-trans-2,3-tetramethylene-1,2,3,4-tetrahydroquinoline of the formula

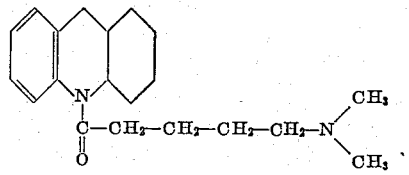

was prepared from trans-2,3-tetramethylene-1,2,3,4-tetrahydroquinoline, ω-chloropentanoyl-chloride and dimethylamine through the intermediate 1-(ω-chloropentanoyl)-trans-2,3-tetramethylene-1,2,3,4-tetrahydroquinoline.

The hydrochloride of the trans-base had a melting point of 155–158° C.

EXAMPLE 33

Using a procedure analogous to that described in Example 3, 1-(α-dimethylamino-propionyl)-trans-2,3-tetramethylene-1,2,3,4-tetrahydroquinoline of the formula

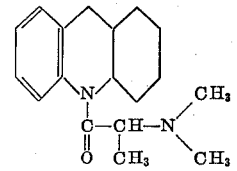

was prepared from trans-2,3-tetramethylene-1,2,3,4-tetrahydroquinoline, α-bromopropionyl-bromide and dimethylamine through the intermediate 1-(α-bromopropionyl)-trans-2,3-tetramethylene-1,2,3,4-tetrahydroquinoline.

The hydrochloride of the trans-base had a melting point of 210° C.

The hydrochloride of the corresponding cis-base, prepared by the method of Example 5 from cis-2,3-tetramethylene-1,2,3,4-tetrahydroquinoline, α-bromopropionyl-bromide and dimethylamine through the intermediate 1-(α-bromopropionyl)-cis-2,3 - tetramethylene-1,2,3,4-tetrahydroquinoline (M.P. 95° C.), had a melting point of 225° C.

The tartrate of the cis-base had a melting point of 139° C.

The maleate of the cis-base had a melting point of 134° C.

The citrate of the cis-base had a melting point of 167–168° C.

EXAMPLE 34

Using a procedure analogous to that described in Example 5, 1-(α-methylamino-propionyl)-cis-2,3-tetramethylene-1,2,3,4-tetrahydroquinoline of the formula

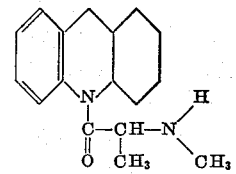

was prepared from cis-2,3-tetramethylene-1,2,3,4-tetrahydroquinoline, α - bromopropionyl - bromide and methylamine.

The hydrobromide of the cis-base had a melting point of 237° C.

EXAMPLE 35

Using a procedure analogous to that described in Example 3, 1-(β-dimethylamino-butyryl) - trans-2,3-tetramethylene-1,2,3,4-tetrahydroquinoline of the formula

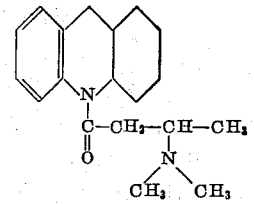

was prepared from trans-2,3-tetramethylene-1,2,3,4-tetrahydroquinoline, β-chlorobutyryl-chloride and dimethylamine through the intermediate 1-(β-chlorobutyryl)-trans-2,3-tetramethylene-1,2,3,4-tetrahydroquinoline, which is an oil at normal temperature.

The hydrochloride of the trans-base had a melting point of 200° C.

EXAMPLE 36

Using a procedure analogous to that described in Example 3, 1(α-dimethylamino-butyryl)-trans-2,3-tetramethylene-1,2,3,4-tetrahydroquinoline of the formula was prepared from trans-2,3-tetramethylene-1,2,3,4-tetrahydroquinoline, α-bromobutyryl-bromide and dimethylamine through the intermediate 1-(α-bromobutyryl)-trans - 2,3 - tetramethylene - 1,2,3,4 - tetrahydroquinoline, which is an oil at room temperature.

The hydrochloride of the trans-base had a melting point of 120° C.

EXAMPLE 37

Using a procedure analogous to that described in Example 1, 6-methoxy-1-(dimethylamino-acetyl)-trans-2,3-tetramethylene-1,2,3,4-tetrahydroquinoline of the formula was prepared from 6-methoxy-trans-2,3-tetramethylene-1,2,3,4-tetrahydroquinoline (M.P. 72° C.), chloroacetyl-chloride and dimethylamine through the intermediate 6 - methoxy - 1 - chloroacetyl - trans - 2,3 - tetramethylene-1,2,3,4-tetrahydroquinoline (M.P. 114° C.).

The hydrochloride of the trans-base had a melting point of 217° C.

EXAMPLE 38

Using a procedure analogous to that described in Example 3, 6-methoxy-1-(β-dimethylamino-propionyl)-trans - 2,3 - tetramethylene - 1,2,3,4 - tetrahydroquinoline of the formula was prepared from 6-methoxy-trans-2,3-tetramethylene-1,2,3,4-tetrahydroquinoline, β - chloropropionyl-chloride and dimethylamine through the intermediate 6-methoxy-1 - (β - chloropropionyl) - trans - 2,3 - tetramethylene-1,2,3,4-tetrahydroquinoline (M.P. 133–134° C.).

The hydrochloride of the trans-base had a melting point of 174° C.

EXAMPLE 39

Using a procedure analogous to that described in Example 1, 8-methyl-1-(dimethylamino-acetyl)-trans-2,3-tetramethylene-1,2,3,4-tetrahydroquinoline of the formula was prepared from 8-methyl-trans-2,3-tetramethylene-1,2,3,4-tetrahydroquinoline (M.P. 71° C.), chloroacetyl-chloride and dimethylamine through the intermediate 8-methyl - 1 - chloroacetyl - trans - 2,3 - tetramethylene-1,2,3,4-tetrahydroquinoline.

The hydrochloride of the trans-base had a melting point of 148–150° C.

EXAMPLE 40

Using a procedure analogous to that described in Example 3, 8 - methyl-1-(β-dimethylamino-propionyl)-trans - 2,3 - tetramethylene-1,2,3,4-tetrahydroquinoline of the formula was prepared from 8-methyl-trans-2,3-tetramethylene-1,2,3,4 - tetrahydroquinoline, β-chloropropionyl-chloride and dimethylamine through the intermediate 8-methyl-1 - (β - chloropropionyl) - trans - 2,3 - tetramethylene-1,2,3,4-tetrahydroquinoline.

The hydrochloride of the trans-base had a melting point of 173° C.

EXAMPLE 41

Using a procedure analogous to that described in Example 1, 6-chloro-1-(dimethylamino-acetyl)-cis-2,3-tetramethylene-1,2,3,4-tetrahydroquinoline of the formula was prepared from 6 - chloro-cis - 2,3 - tetramethylene-1,2,3,4-tetrahydroquinoline (M.P. 47° C.), chloroacetyl-chloride and dimethylamine through the intermediate 6-chloro - 1 - chloroacetyl - cis - 2,3 - tetramethylene-1,2,3,4-tetrahydroquinoline (M.P. 94° C.).

The hydrochloride of the cis-base had a melting point of 159° C.

EXAMPLE 42

Using a procedure analogous to that described in Example 1, 6-chloro-1-(pyrrolidino-acetyl)-cis-2,3-tetramethylene-1,2,3,4-tetrahydroquinoline of the formula was prepared from 6 - chloro-cis - 2,3 - tetramethylene-1,2,3,4-tetrahydroquinoline, chloroacetyl-chloride and pyrrolidine through the intermediate 6-chloro-1-chloroacetyl-cis-2,3-tetramethylene-1,2,3,4-tetrahydroquinoline.

The hydrochloride of the cis-base had a melting point of 275° C.

EXAMPLE 43

Using a procedure analogous to that described in Example 5, 6-chloro-1-(β-dimethylamino-propionyl)-cis- 2,3-tetramethylene-1,2,3,4-tetrahydroquinoline of the formula

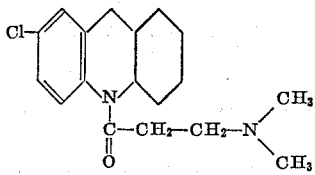

was prepared from 6 - chloro - cis - 2,3 - tetramethylene-1,2,3,4-tetrahydroquinoline, β-chloropropionyl-chloride and dimethylamine through the intermediate 6-chloro-1 - (β - chloropropionyl) - cis - 2,3 - tetramethylene-1,2,3,4-tetrahydroquinoline (M.P. 113° C.).

The hydrochloride of the cis-base had a melting point of 158° C.

EXAMPLE 44

Using a procedure analogous to that described in Example 5, 6-chloro-1-(β-piperidino-propionyl)-cis-2,3-tetramethylene-1,2,3,4-tetrahydroquinoline of the formula

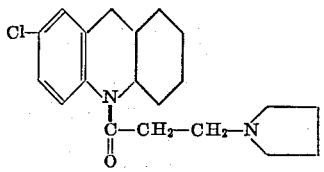

was prepared from 6 - chloro - cis - 2,3 - tetramethylene-1,2,3,4-tetrahydroquinoline, β-chloropropionyl-chloride and piperidine through the intermediate 6-chloro-1-(β-chloropropionyl) - cis - 2,3 - tetramethylene - 1,2,3,4-tetrahydroquinoline.

The hydrochloride of the cis-base had a melting point of 208° C.

EXAMPLE 45

Using a procedure analogous to that described in Example 1, 6-bromo-1-(dimethylamino-acetyl)-2,3-tetramethylene-1,2,3,4-tetrahydroquinoline of the formula

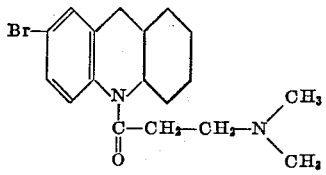

was prepared from 6-bromo-2,3-tetramethylene-1,2,3,4-tetrahydroquinoline (B.P. 139–145° C. at 0.15 mm. Hg), chloroacetylchloride and dimethylamine through the intermediate 6-bromo-1-chloroacetyl-2,3-tetramethylene-1,2,3,4-tetrahydroquinoline.

The oxalate of the free base had a melting point of 182° C.

EXAMPLE 46

Using a procedure analogous to that described in Example 7, 1-(piperidino-acetyl)-2,3-pentamethylene-1,2,3,4-tetrahydroquinoline of the formula

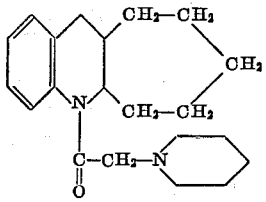

was prepared from 2,3-pentamethylene-1,2,3,4-tetrahydroquinoline, chloroactelyl - chloride and piperidine through the intermediate 1-chloroacetyl-2,3-pentamethylene-1,2,3,4-tetrahydroquinoline.

The hydrochloride of the free base had a melting point of 216–217° C.

The compounds according to the present invention, that is, the free bases embraced by Formula I above, their non-toxic acid addition salts, their non-toxic quaternary ammonium salts, cis-stereoisomers of the free bases, and their non-toxic acid addition and quaternary ammonium salts, trans-stereoisomers of the free bases and their non-toxic acid addition and quaternary ammonium salts, and stereoisomer mixtures of the free bases and their non-toxic acid addition and quaternary ammonium salts, have useful pharamacodynamic properties. More particularly, the compounds of the present invention exhibit analgesic activity of long duration; in addition, they possess sedative, cough-depressant and hypotensive properties. These activities are accompanied by a stimulation of the intestinal peristalsis rather than a reduction.

The compounds according to the present invention may be administered perorally, intravenously, parenterally or by rectum. Most advantageously, they are administered in the form of dosage unit compositions consisting essentially of an inert, physiologically compatible carrier substance having uniformly dispersed therein a dosage unit of the active ingredient. The effective dosage unit of the compounds of the present invention is 20–200 mgm., preferably 50–100 mgm.

The following examples illustrate various dosage unit compositions comprising the compounds of the present invention as active ingredients. The parts are parts by weight.

EXAMPLE 47

*Tablets*

The tablets are compounded from the following ingredients:

| | Parts |
|---|---|
| 10-(dimethylamino-acetyl)-trans-1,2,3,4,9,9a,10,10a-octahydro-acridine·HCl | 50.0 |
| Silicic acid, pressed | 50.0 |
| Calcium phosphate, secondary | 200.0 |
| Corn starch, dry | 92.0 |
| Gelatin | 5.0 |
| Magnesium stearate | 3.0 |
| Total | 400.0 |

*Compounding procedure.* — The octahydro-acridine compound, the silicic acid, the calcium phosphate and the corn starch are admixed with each other, and the mixture is moistened with an aqueous 6% solution of the gelatin. The moist mixture is passed through a 1.5 mm.-mesh screen and the resulting granulate is dried at 45° C. The dry granulate is again passed through the screen, is admixed with the magnesium stearate, and the mixture is pressed into 400 mgm. tablets. Each tablet contains 50 mgm. of the active ingredient.

EXAMPLE 48

*Coated pills*

The tablets obtained in Example 47 are provided with a thin shell consisting essentially of sugar and talcum. The coated pills are then polished with bees' wax.

EXAMPLE 49

*Gelatin capsules*

The contents of the capsules are compounded from the following ingredients:

| | Parts |
|---|---|
| 10-(dimethylamino-acetyl)-trans-1,2,3,4,9,9a,10,10a-octahydro-acridine·HCl | 50.0 |
| Lactose | 140.0 |
| Talcum | 10.0 |
| Total | 200.0 |

*Compounding procedure.*—The ingredients are admixed with each other, and the mixture is passed through a 0.75 mm.-mesh screen. 200 mgm. portions of the screened mixture are filled into gelatin capsules of appropriate size. Each capsule contains 50 mgm. of the active ingredient.

EXAMPLE 50

Suppositories

The suppositories are compounded from the following ingredients:

| | Parts |
|---|---|
| 10-(dimethylamino-acetyl)-trans-1,2,3,4,9,9a,10,10a-octahydro-acridine·HCl | 100.0 |
| Suppository base (cocoa butter) | 1600.0 |
| Total | 1700.0 |

*Compounding procedure.*—The cocoa butter is melted and the finely divided octahydro-acridine compound is stirred into the molten mass. The resulting mixture is poured into cooled suppository molds holding 1700 mgm. of the mixture. Each suppository weighs 1700 mgm. and contains 100 mgm. of active ingredient.

It will be obvious to those skilled in the art that the above dosage unit composition examples are merely illustrative, and that any of the other compounds embraced by Formula I or their non-toxic acid addition and quaternary ammonium salts may be substituted for the octahydro-acridine compound used in these examples. Moreover, it is readily apparent that the quantities of active ingredient may be varied in the above dosage unit compositions within the limits set forth above to suit particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound selected from the group consisting of 1-aminoalkanoyl-2,3,-polymethylene-1,2,3,4 - tetrahydroquinolines of the formula

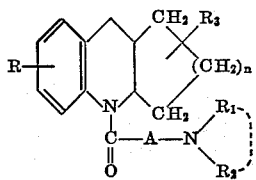

wherein A is alkylene of 1 to 5 carbon atoms,
R is selected from the group consisting of hydrogen, halogen, lower alkyl and lower alkoxy,
$R_1$ is selected from the group consisting of hydrogen, lower alkyl and hydroxy-lower alkyl,
$R_2$ is selected from the group consisting of lower alkyl and hydroxy-lower alkyl,
$R_1$ and $R_2$, together with each other and the adjacent nitrogen atom, are basic heterocycles selected from the group consisting of pyrrolidino, lower alkyl-substituted pyrrolidino, piperidino, lower alkyl-substituted piperidino, morpholino,
$R_3$ is selected from the group consisting of hydrogen and lower alkyl, and
$n$ is an integer from 1 to 3, inclusive, their non-toxic, pharmacologically acceptable acid addition salts, their 1-[ω-(quaternary ammonium)-alkanoyl] salts formed with quaternizing agents selected from the group consisting of alkyl halides, aralkyl halides and aromatic sulfonic acid esters, cis-stereoisomers of said tetrahydroquinolines and their non-toxic salts and trans-stereoisomers of said tetrahydroquinolines and the non-toxic salts.

2. 10 - (dimethylamino-acetyl)-trans- 1,2,3,4,9,9a,10,10a-octahydro-acridine hydrochloride.

3. 10 - (β - dimethylamino-propionyl)-trans-1,2,3,4,9,9a,10,10a-octahydro-acridine hydrochloride.

4. 10 - (dimethylamino-acetyl)-cis-1,2,3,4,9,9a,10,10a-octahydro-acridine hydrochloride.

5. 10 - (γ - dimethylamino-butyryl)-trans-1,2,3,4,9,9a,10,10a-octahydro-acridine hydrochloride.

6. 10 - (dimethylamino-acetyl)-7-methoxy-trans-1,2,3,4,9,9a,10,10a-octahydro-acridine hydrochloride.

7. 10 - (dimethylamino-acetyl)-5-methyl-trans-1,2,3,4,9,9a,10,10a-octahydro-acridine hydrochloride.

8. 10 - (β - dimethylamino-propionyl)-cis-1,2,3,4,9,9a,10,10a-octahydro-acridine hydrochloride.

9. 1 - (β-piperidino-propionyl)-2,3,-trimethylene-1,2,3,4-tetrahydroquinoline hydrochloride.

References Cited by the Examiner

UNITED STATES PATENTS

| | | | |
|---|---|---|---|
| 2,625,548 | 1/1953 | Cusic | 260—247.2 |
| 2,666,051 | 1/1954 | Hafliger et al. | 260—239 |
| 2,786,845 | 3/1957 | Mauss et al. | 260—288 |
| 2,944,054 | 6/1960 | Gordon. | |
| 3,004,889 | 10/1961 | Kuna et al. | 167—65 |
| 3,024,166 | 3/1962 | Kuna et al. | 167—65 |
| 3,025,288 | 3/1962 | Schindler | 260—239 |
| 3,066,141 | 11/1962 | Jones et al. | 260—279 |

OTHER REFERENCES

Sargent et al.: J. Org. Chem., volume 23, pages 1938–40 (1958).

ALEX MAZEL, *Primary Examiner.*

NICHOLAS S. RIZZO, HENRY R. JILES, *Examiners.*

D. M. KERR, D. G. DAUS, *Assistant Examiners.*

UNITED STATES PATENT OFFICE
CERTIFICATE OF CORRECTION

Patent No. 3,282,943                                  November 1, 1966

Klaus Landgraf et al.

It is hereby certified that error appears in the above numbered patent requiring correction and that the said Letters Patent should read as corrected below.

Column 4, line 27, for "coloroless" read -- colorless --; column 6, line 4, for "9.9a," read -- 9.9a,10, --; line 37, for "propinoyl" read -- propionyl --.

Signed and sealed this 5th day of September 1967.

(SEAL)
Attest:

ERNEST W. SWIDER                                        EDWARD J. BRENNER
Attesting Officer                                           Commissioner of Patents